(12) United States Patent
Berry et al.

(10) Patent No.: US 8,010,281 B2
(45) Date of Patent: Aug. 30, 2011

(54) METHOD AND APPARATUS FOR PROVIDING A NAVIGATION SUMMARY

(75) Inventors: Joseph J. Berry, Northville, MI (US); Mark Scalf, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 12/361,797

(22) Filed: Jan. 29, 2009

(65) Prior Publication Data
US 2010/0191463 A1 Jul. 29, 2010

(51) Int. Cl.
*G01C 21/34* (2006.01)
(52) U.S. Cl. ........ 701/201; 700/200; 700/208; 700/209; 340/995.2; 340/995.27
(58) Field of Classification Search .................. 701/117, 701/119, 200, 201, 204, 206–211, 213; 340/905, 340/936, 995.1, 995.13, 995.19, 995.27, 340/995.2
See application file for complete search history.

(56) References Cited

U.S. PATENT DOCUMENTS

| | | | | |
|---|---|---|---|---|
| 5,220,507 A | * | 6/1993 | Kirson | 701/202 |
| 2007/0038362 A1 | * | 2/2007 | Gueziec | 701/117 |
| 2007/0198172 A1 | * | 8/2007 | Sumizawa et al. | 701/201 |
| 2007/0290839 A1 | | 12/2007 | Uyeki et al. | |

OTHER PUBLICATIONS

Ford Motor Company, "Navigation System: SYNC," Owner's Guide Supplement, SYNC Version 1 (Jul. 2007).
Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
International Searching Authority, International Search Report and the Written Opinion for the corresponding PCT Application No. PCT/US2009/69668 mailed Mar. 4, 2010.
Kermit Whitfield, "A hitchhiker's guide to the telematics ecosystem", Automotive Design & Production, Oct. 2003, http://findarticles.com, pp. 1-3.

* cited by examiner

*Primary Examiner* — Khoi Tran
*Assistant Examiner* — Spencer Patton
(74) *Attorney, Agent, or Firm* — Jennifer Stec; Brooks Kushman P.C.

(57) ABSTRACT

A route between locations includes a detailed set of directions to get from a present location to a destination. A route summary is provided, showing a subset of the roads needed to be traveled to go from the present location to the destination. The route summary is determined at least in part based on a set of rules for evaluating the roads in the route for inclusion in the route summary.

15 Claims, 6 Drawing Sheets

METHOD AND APPARATUS FOR PROVIDING A NAVIGATION SUMMARY

BACKGROUND AND SUMMARY

Technical Field

The illustrative embodiments generally relate to providing summarized navigation directions. More specifically, the illustrative embodiments relate to obtaining a series of navigation directions and then, based at least in part on defined rules, providing a subset of those navigation directions as a summary of the directions.

The advent of personal navigation devices and Internet mapping engines, such as MAPQUEST, GOOGLE MAPS, and VIRTUAL EARTH, have revolutionized the task of obtaining navigation directions. Travelers can input a starting location and a destination and receive a detailed series of instructions as to how to precisely reach the destination. Unfortunately, the instructions are often overly detailed. For example, a search from Northville, Mich. to Southfield, Mich. on www.mapquest.com, at the time of the filing of this application, provides the following directions:

Start out going south on N. Center St toward W. Main St.—0.0 miles
Turn left onto E. Main St./Northville Rd.—0.2 miles
Turn left onto Griswold St.—0.7 miles
Turn slight right onto Baseline Rd.—0.1 miles
Baseline Rd. becomes Griswold St.—0.1 miles
Turn right onto 8 Mile Rd.—1.9 miles
Merge onto I-275 N/I-96 W—2.1 miles
Take the M-5 N/I-696/M-5 E exit, EXIT 165, toward Grand River Ave/Port Huron—0.4 miles
Take the exit on the left toward I-696/Port Huron—0.4 miles
Merge onto I-696 E/Walter P Reuther Fwy toward Port Huron—11.2 miles
Take the 11 Mile Rd. Exit, Exit 12, toward Southfield Rd.—0.3 miles
Stay straight to go onto W. 11 Mile Rd.—0.2 miles
Turn right onto Southfield Rd.—1.0 miles
Turn right onto W. 10 Mile Rd.—0.0 miles While the above directions are very precise, they are so precise that they might confuse a traveler. Further, if a traveler is driving on the highway, the 0.4 mile changes between I-275 and I-696 could be confusing to follow, especially while driving. Because such directions are often overly precise, another option for travelers is to call ahead to the destination and get directions. The directions provided in these instances are typically much more general. For example, the above route could be described by a person as follows:

Go to I-275 and take it North to I-696
Take I-696 East to the 11 Mile Rd Exit
Take 11 Mile to Southfield Rd and turn right
Turn right on to 10 Mile Simpler directions such as the above often will suffice, since a traveler can usually use signs to find the necessary highways, or, if coming from a familiar area, will know how to get to the necessary highways. Even people unfamiliar with the switch from I-275 to I-696 can use the posted signs to determine how to get from one highway to another without instructions every 0.4 miles as provided by MAPQUEST.

Unfortunately, people are not always available to provide such directions. For example, directions may be needed outside of business hours, or the people at the destination may be unaware of how to reach the destination from the traveler's location. In these situations, the conventional Internet services or personal navigation devices may be useful, but then the potentially overly precise directions are obtained.

According to at least one aspect of the illustrative embodiments, a computerized lookup of directions is performed from a navigation database, and then the directions are summarized according at least in part to a set of defined rules. This provides a traveler with digitally accurate directions that are not overly complicated. Additionally, if the summary is concise enough, it can be delivered to the traveler as, for example, an SMS message. Other delivery modes are possible as well, including, but not limited to, email, an onscreen navigation system display, and speech-delivery to, for example, a phone or radio.

There are many different ways in which a route can be summarized, and any number of defined rules can be used. In at least one aspect of the illustrative embodiments, a weighting system is used, such that all roads are assigned certain base values. Then, for example, the distance traveled on the road can be multiplied by the base value of the road, and a weighted value can be had for each road along the route. Based on additional rules, these weighted values can be used to determine which roads are included in a summary.

Other rules for summary are also possible and a non-exhaustive list includes, for example: 1) any road on which X distance is traveled; 2) User defined roads for inclusion; 3) any main road (main roads being defined according to a rule, such as, for example, speed limits); 4) traffic on roads; etc.

The combination of the accuracy of digital mapping and directions combined with one or more rules for summarization provides a traveler with an accurate, concise set of instructions as to how to reach a destination. Further, since the digital map can know all or almost all areas, it could be possible for a traveler to drill down on a particular area if the summary is insufficient. For example, if the traveler was unable to reach I-275 without better instructions, the traveler could drill down on that portion of the summary to a more detailed summary or even a full set of turn-by-turn directions. This allows a customizable user experience that can be useful and enjoyable to travelers of all levels of sophistication with respect to the layout of a particular area.

BRIEF DESCRIPTION OF THE DRAWINGS

Other objects, aspects and characteristics of the illustrative embodiments will become apparent from the following detailed description of exemplary embodiments, when read in view of the accompanying drawings, in which.

DETAILED DESCRIPTION OF EMBODIMENTS OF THE INVENTION

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
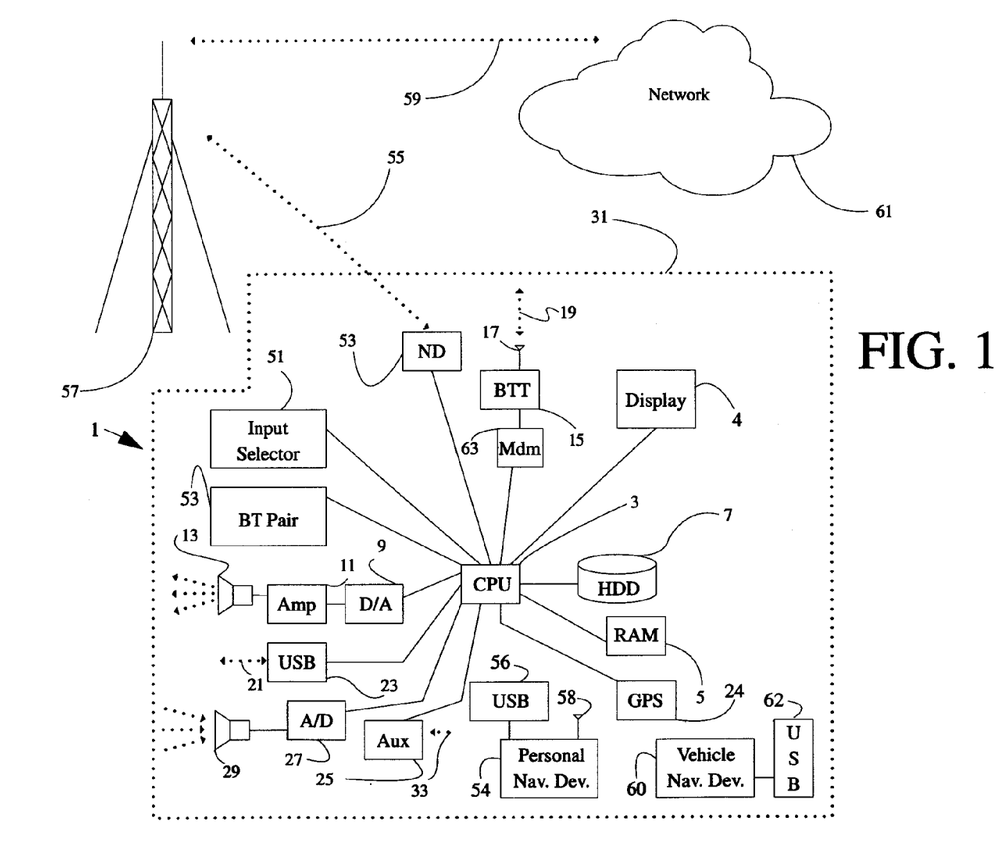
FIG. 1 shows an exemplary illustrative system usable for delivery of directions to an automobile.

FIG. 1 illustrates system architecture of an illustrative onboard communication system usable for delivery of directions to an automobile. A vehicle enabled with a communication and entertainment system (VCES) may contain a visual front end interface 4 located in the vehicle. The user may also be able to interact with the interface if it is provided, for example, with a touch sensitive screen. In another illustrative embodiment, the interaction occurs through audible speech and speech synthesis.

In the illustrative embodiment 1 shown in FIG. 1 a processor 3 controls the operation of the system. Provided within the vehicle itself, the processor allows onboard processing of commands and routines. Further, the processor is connected to both temporary 5 and permanent storage 7. In this illustrative embodiment, the temporary storage is random access memory (RAM) and the permanent storage is a hard disk drive (HDD) or flash memory.

The processor is also provided with a number of different inputs for the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device (not shown) or a USB device (not shown) along the bi-directional data streams shown at 19 and 21 respectively.

In one illustrative embodiment, the system 1, uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 53 or similar input, telling the CPU that the onboard BLUETOOTH transceiver will be paired with a BLUETOOTH transceiver in a nomadic device.

Data may be communicated between CPU 3 and network 61 utilizing a data-plan associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. This data may include such things as a requested set of directions to a location. Alternatively, the data may include a series of roads between a location and a destination, and the vehicle processor may determine the actual roads to be taken. In the case of directional data, for example, the data can be stored on the HDD 7 until such time as the data is no longer needed.

Even if a series of precise directions is downloaded, the user, especially if familiar with the area in which he or she is traveling, may only want a brief summary of the route to be traveled. In this case, the user may input a button command or verbally request a route summary. Further, processing for determination of the route and the summary of the route can be done on-board (through use of, for example, the CPU and GPS) or off-board at a remote site. Route information may be obtained from one or more sources, such as a personal navigation device 54, having, for example, a USB connection 56 and/or an antenna 58. The information can also be obtained from a vehicle navigation device 60, having a USB 62 or other connection, an onboard GPS device 24, or remote navigation system (not shown) having connectivity to network 61.

Figure 2:
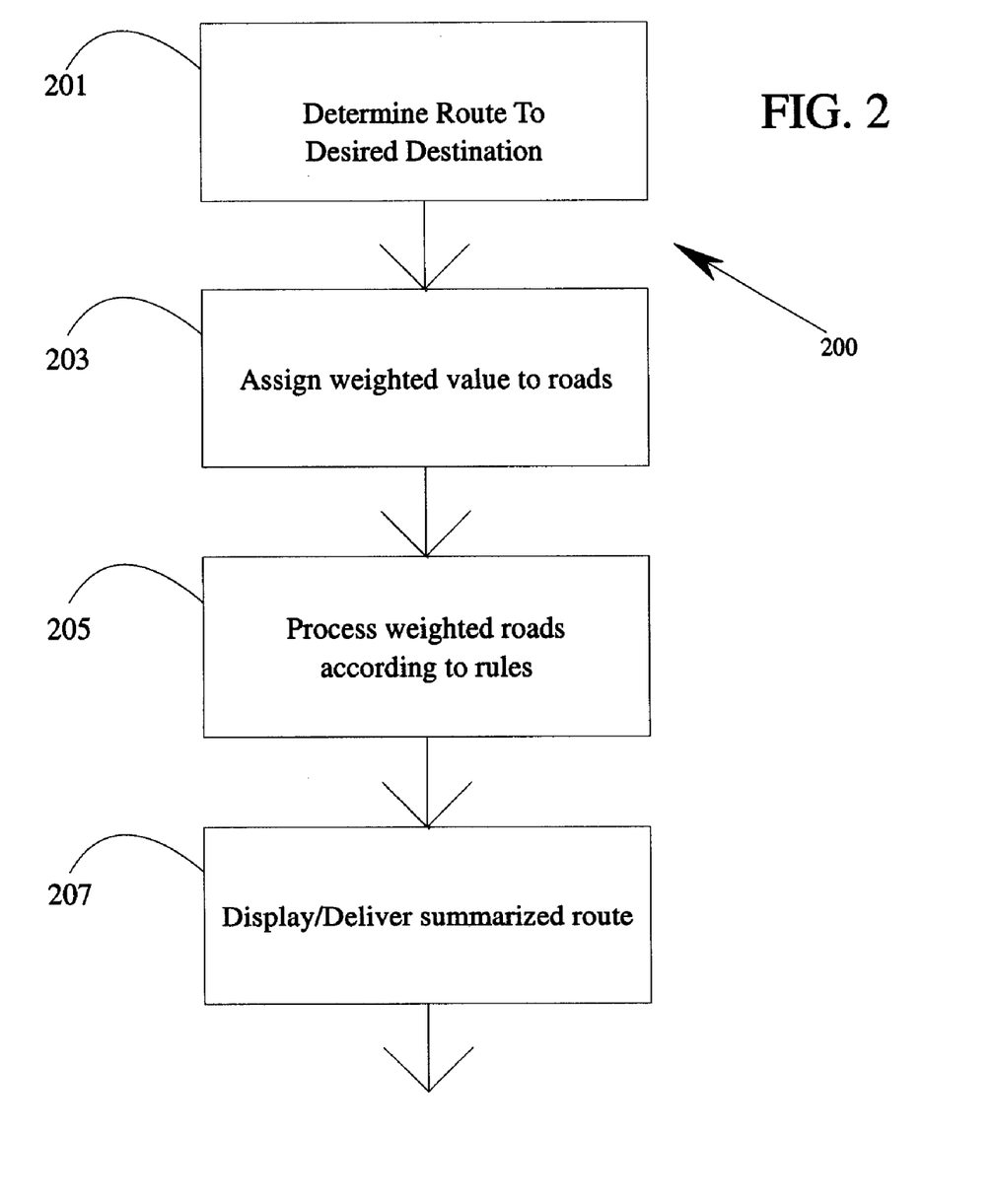
FIG. 2 shows an overview of an exemplary illustrative route summarizing routine.

According to one illustrative embodiment, a request for a route summary may trigger a routine such as that shown in FIG. 2. FIG. 2 is an exemplary routine according to one embodiment, but other ways of summarizing a route are possible based on the methodologies taught herein. The exemplary process flows shown herein encapsulate a small subset of these routines for exemplary purposes only.

Upon receiving input (by button selection, voice prompt, etc.) defining a desired destination, processor 3 running routine 200 will first proceed to determine a complete route between, for example, the user's present position and the desired destination as represented in block 201. After the route (which is comprised of a series of roads on which the user must travel) has been determined, the processor will assign a weighted value to each of the roads as represented in block 203. In this embodiment, the roads are assigned a weighted value as a means of determining which roads are to be included in a summary. However, many different ways of measuring the roads against each other for inclusion/exclusion are possible. For example, the summary could always include all highways and no side roads, or it could be a list of any road on which travel of more than one mile is necessary, etc. An exemplary illustrative weighting system will be described in conjunction with FIG. 3.

After assigning weighted values to the roads, the processor, in this illustrative embodiment, processes the weighted roads according to one or more rules as represented in block 205. For example, a first rule could require that the road with the highest weighted value is always included in a summary. A second rule could provide for the addition of a second or further roads in a summary based on one or more equations, for example. Several exemplary rules for inclusion of roads will be described in conjunction with FIGS. 4 and 5.

After the rules have all been processed and roads have been included or excluded from the summary, the summarized route is displayed or otherwise delivered too the user as represented in block 207. A multitude of exemplary delivery mediums are available, including, but not limited to, SMS messaging, email, on-board display and spoken delivery via voice synthesis at vehicle entertainment system. Further, since the exemplary system can store a copy of the route summary in memory, if desired, it may be possible that the route can be played back or redelivered at any time for the driver's convenience, or as the driver's location changes.

Figure 3:
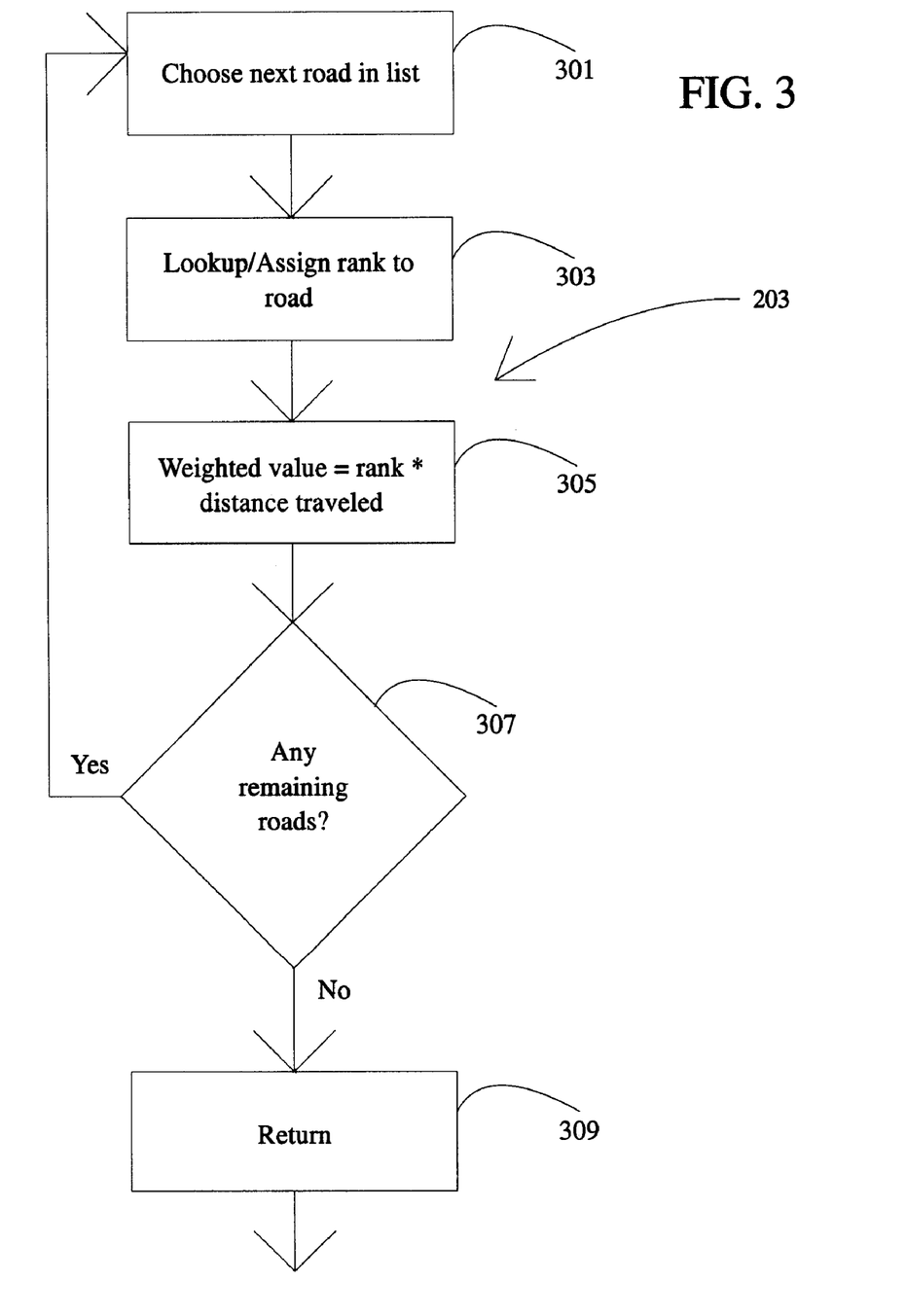
FIG. 3 shows an overview of an exemplary process within the exemplary illustrative routine of FIG. 2.

In one illustrative embodiment, the processor 3 assigns weighted values to roads in order to aid in the determination of which roads should be included in the route summary. Although the roads are weighted in this illustrative embodiment to aid in summary determination, various methods of gauging the roads for inclusion may be used.

One exemplary method of weighting the roads begins by assigning base values to each road. An existing routing engine, such as DECARTA, provides values of 1-5 based on, for example, road speed limits. Various ranges of numbers and various factors can be used for assigning a base value to each road in this embodiment.

In this illustrative embodiment, the processor 3 selects the next road on the route, starting with the road on which the user is presently traveling as represented in block 301. Next, based on various factors, such as, for example, road speed limits, the processor assigns a base value to the road as represented in block 303. Alternatively, each road in the route can be provided with a base value at processor 3 when the route is transferred to the vehicle 31.

Next, the selected road is given a weighted value as represented in block 305, which, in this illustrative embodiment, is the distance to be traveled on the road times the base value assigned to the road in step 303. In this manner, the road is given a final weighted value to be used for gauging the selected road for inclusion in the summary. This particular weighting system provides results such that a lowest ranked (1) type road, for example, will need to be traveled on five times the distance of a highest ranked (5) type road to have equal value when considered in the summary. In general, this will result in only the higher ranked and or most traveled roads being included in the summary.

After the weighted value is assigned to a road, the processor checks to see if there are any remaining roads that need weighted values assigned to them as represented in block 307. If so, the processor 3 chooses the next road in the summary and assigns a weighted value to it in the manner described above.

Once all roads have weighted values assigned thereto, the processor may proceed with evaluating the roads against each other.

Figure 4:
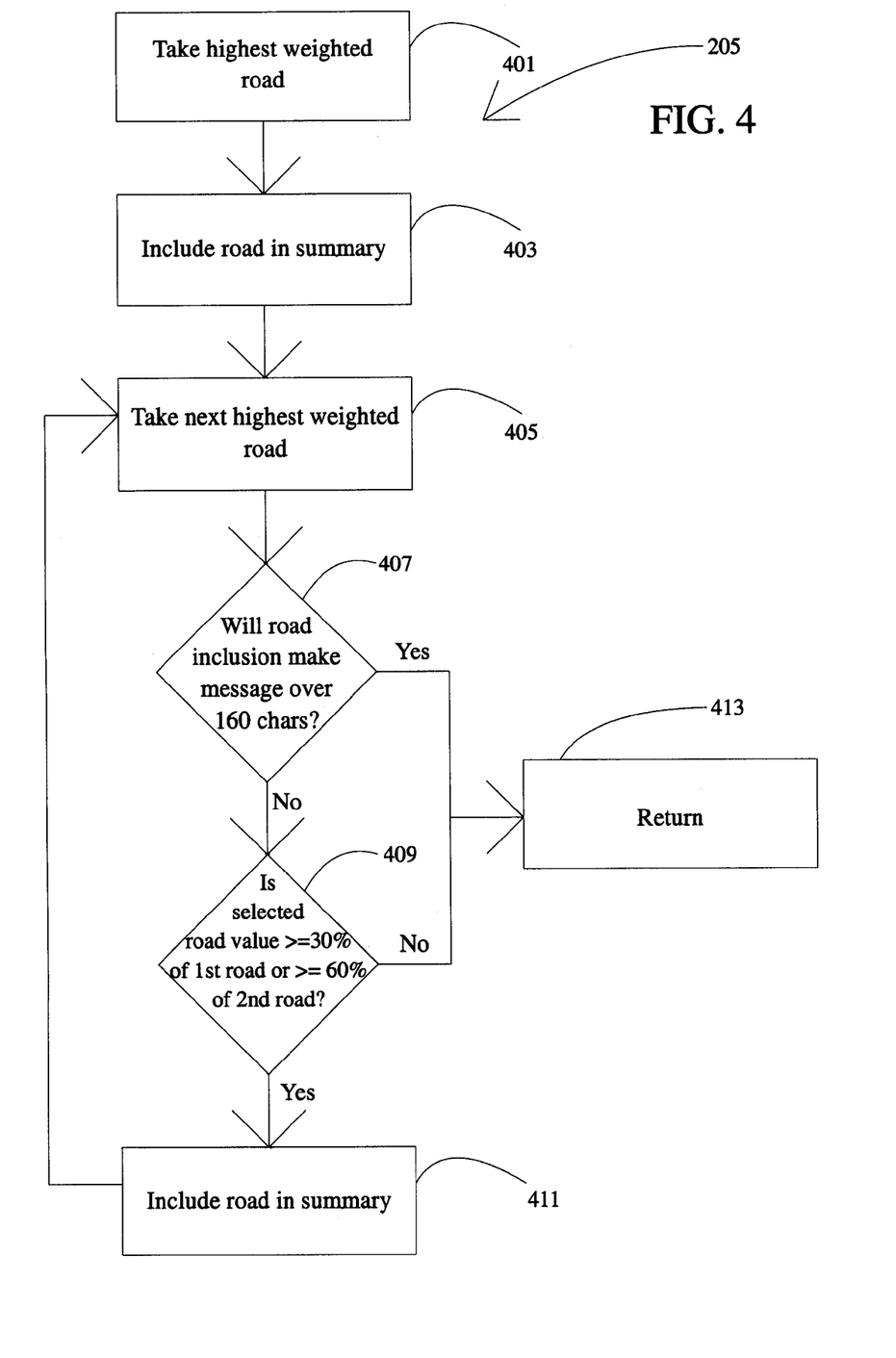
FIG. 4 shows a further overview of an exemplary illustrative process within the exemplary routine of FIG. 2.

FIG. 4 shows one exemplary method 205 of comparing the weighted roads for determining which roads should be included in the route summary. Although this is one exemplary method of selecting roads, other suitable systems for ranking the roads against each other can be used.

In the exemplary method shown in FIG. 4, the processor 3 selects the highest weighted road from all the roads included in the route as represented in block 401. In this illustrative embodiment, the highest weighted road is always included in the summary as represented in block 403. After storing this road in the summary list, the processor 3 selects the next highest road in the list for processing as represented in block 405.

Depending on the particular weighting system, additional considerations and rules may be used to determine whether roads are suitable for inclusion in the summary. For example, if the summary route is to be delivered in an SMS text message or as a verbal playback, it may be desirable to keep the message under a certain length. In one illustrative embodiment, the message must be under one hundred sixty characters in length as represented in block 407. If the inclusion of the road will not increase the total length of the summary to over one hundred characters (based on the road name), the processor 3 proceeds to analyze the road for inclusion.

In this particular illustrative embodiment, the processor determines if the selected road's weighted value is greater than or equal to 30% of the value of the first road or greater than or equal to 60% of the value of the second road (unless the selected road is the second road) as represented in block 409. Further, it may only be desirable to include a limited number of roads, so in addition to the above constraints, the routine may limit the total number of roads to be included in the summary (e.g., no more than three roads).

If the selected road meets all the requirements for inclusion in the summary, the processor includes the road in the route summary as represented in block 411, and checks for the next highest weighted road remaining in the route directions. Otherwise, as soon as a road is rejected based on the rules, the process returns for route display.

One Example Would be as Follows

The Route:
Start out going south on N. Center St toward W. Main St.—0.0 miles
Turn left onto E. Main St./Northville Rd.—0.2 miles
Turn left onto Griswold St.—0.7 miles
Turn slight right onto Baseline Rd.—0.1 miles
Baseline Rd. becomes Griswold St.—0.1 miles
Turn right onto 8 Mile Rd.—1.9 miles
Merge onto I-275 N/I-96 W—2.1 miles
Take the M-5 N/I-696/M-5 E exit, EXIT 165, toward Grand River Ave/Port Huron—0.4 miles
Take the exit on the left toward I-696/Port Huron—0.4 miles
Merge onto I-696 E/Walter P Reuther Fwy toward Port Huron—11.2 miles
Take the 11 Mile Rd. Exit, Exit 12, toward Southfield Rd.—0.3 miles
Stay straight to go onto W. 11 Mile Rd.—0.2 miles
Turn right onto Southfield Rd.—1.0 miles
Turn right onto W. 10 Mile Rd.—0.0 miles
Each Road Would Then Have a Base Value Assigned to it:
N. Center St=1
E. Main St.=1
Griswold St.=1
Baseline Rd.=3
8 Mile Rd.=3
I-275 N=5
I-696 E/Walter P Reuther Fwy=5
W. 11 Mile Rd.=3
Southfield Rd.=3
W. 10 Mile Rd.=3

In this exemplary implementation, any distances along exits/un-named roads are discarded. Exits could be assigned a value, however, if so desired. Each road would then have a weighted value assigned to it, based on the distance traveled*base value:
N. Center St=1*0=0
E. Main St.=1*0.2=0.2
Griswold St.=1*0.7=0.7
Baseline Rd.=3*0.2=0.6
8 Mile Rd.=3*1.9=5.7
I-275 N=5*2.1=10.2
I-696 E/Walter P Reuther Fwy=5*11.2=56
W. 11 Mile Rd.=3*0.2=0.6

Southfield Rd.=3*1=3
W. 10 Mile Rd.=3*0=0

The processor would then include I-696 E/Walter P Reuther Fwy as the highest ranked road. Since the route has two names, the processor can include either one or both. In one illustrative embodiment, base value 4 and 5 roads are named with the number (e.g. I-696) and base value 1-3 roads are named with the road names. Any suitable naming system may be used, however.

After including I-696, the processor selects the next highest weighted value road (I-275). Since inclusion of "I-275" will not put the total length of the message over 100 characters, the processor then checks if the value of the selected road (10.2) is >= to 30% of the value of the highest weighted value road (56*0.3=16.8). Since it is not, in this example, the route summary will only include I-696. While this may seem brief, even for a summary, it may be possible that the driver only needs to know a single highway that will take him or her to the destination. If they are familiar with the area, this may often be the case. Further, the driver may be provided with the ability to drill down in the summary, such that additional portions of the route may be shown.

For example, if the driver could drill down one level, then the process may simply repeat itself with all roads between the road selected for drill down and the next road. If the road selected is the only road, then the process may repeat itself with all roads except the included one.

In this example, a repetition as described above would result in the inclusion of I-275, as that is the highest road remaining. Then, the processor would check 8 mile road (5.7). Since the inclusion of 8 mile will not put the total over 100 characters, and 5.7 is >=3.6 (30% of 10.2), 8 mile would be included.

Next, Southfield road would be considered. Again, the 100 character limit is not reached, but 3 (the weighted value of Southfield road) is <3.6 and <3.42 (60% of 5.7) so Southfield road is not included. Thus, the drill down summary is finished. The driver could conceivable continue to drill down until a desired level of directions is reached, if the developer/provider desired to provide this capability to the driver.

Figure 5:
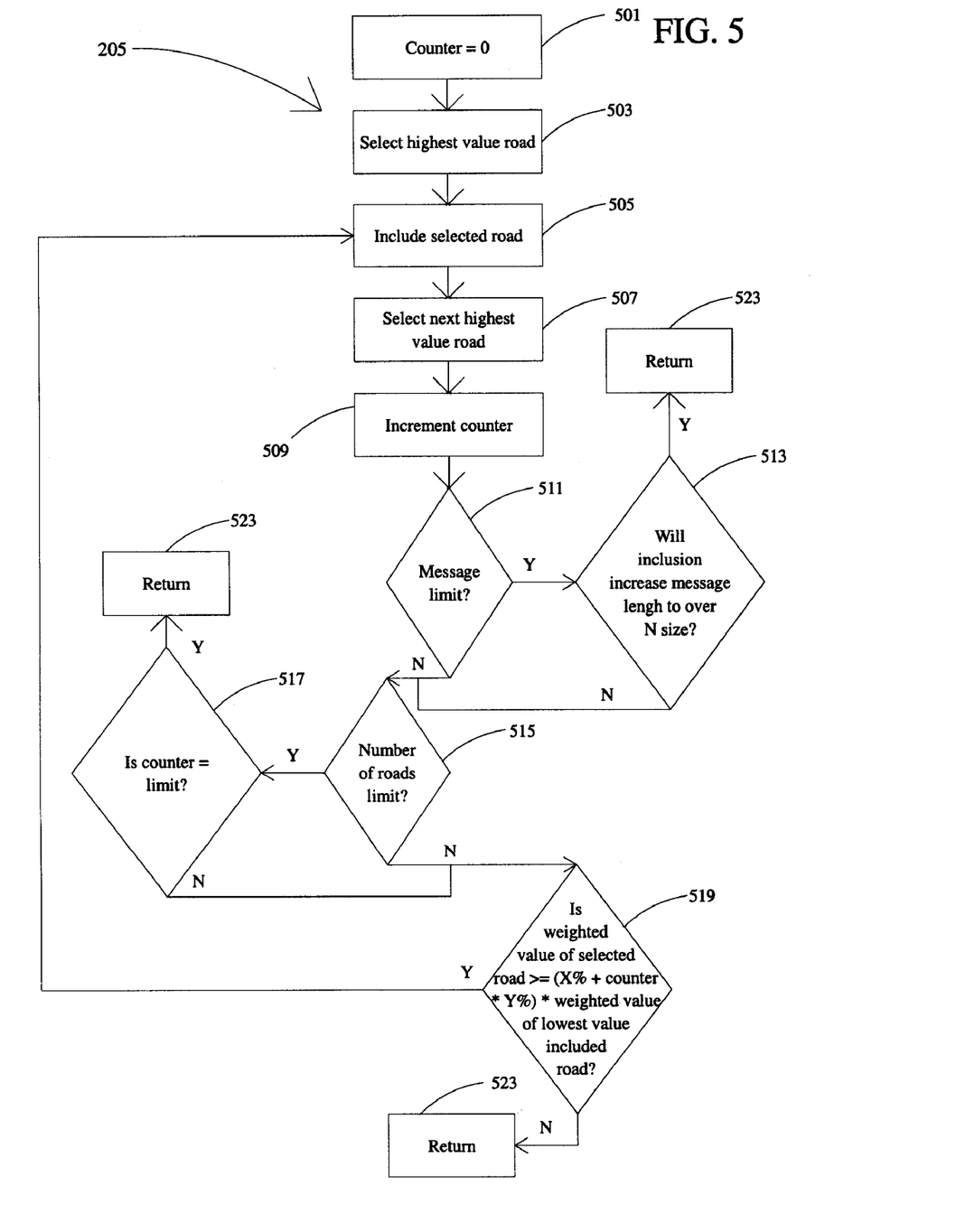
FIG. 5 shows an overview of an alternative to the exemplary illustrative process shown in FIG. 4.

FIG. 5 shows another exemplary illustrative process corresponding to the route selection 205. This is another example of a possible gauging process for determining roads for inclusion in a summary. Although it shares some aspects with the process described with respect to FIG. 4, any suitable process for comparing roads for inclusion in the summary may be used.

In the exemplary process shown in FIG. 5, the processor first sets a counter to zero as represented in block 501 and then selects the highest value road as represented in block 503. As with the process shown in FIG. 4, the highest value road is included in the summary as represented in block 505. Although the highest value road is included the summaries of both examples, this need not always be the case. For example, if a user knew all the major highways and roads between destinations, and needed directions on some of the more localized turns, the road summary may only include roads below a certain threshold, so as to give the user guidance on the less commonly traveled roads in a route.

After the highest value road has been included in the summary, the processor selects the next highest value road for consideration as represented in block 507 and increments the counter as represented in block 509. The counter keeps track of how many roads have already been included in the summary. Although a counter has been in the present example, various ways of determining this information are possible, and any suitable method may be used.

After the counter has been incremented, the processor checks to see if there is a limit on message size as represented in block 511. If the developer/provider has determined that a message should be no longer than N characters, for example, then they can turn on a message length flag to tell the processor that there has been a message length limit set. It may be desirable to limit the message length for various reasons, including driver readability, SMS delivery limits, etc.

If the message flag has been turned on, the processor proceeds to check if inclusion of the selected road (based on the length of the road name) will cause the message to be over N characters in length as represented in block 513. Here, N is a variable that can be determined by the developer/provider. If inclusion will cause the message to be over-long in length, then the processor declines to include the road and returns to the main routine for route display as represented in block 523.

If there is no message size limit, or if the inclusion of the selected road will not cause the message to be overly long, then the processor checks to see if there is a limit as to how may roads may be included in the summary as represented in block 515. As with the message flag that can be set with respect to step as represented in block 511, the developer/provider can also choose to set a flag indicating a limit on the number of total roads that may be included in the summary as represented in block 515.

If the number of roads limit is turned on, the processor checks to see if the counter is equal to whatever limit was set by the developer/provider. For example, if the developer/provider desires that no more than three roads to be included, then the counter will equal three after the fourth road has been selected for analysis. Since decision step 515 comes before any decision to add the fourth road, the processor 3 will register that the counter equals the maximum number of allowed roads as represented in block 517 and return to the main routine for route display as represented in block 523.

If there is no limit on the number of roads, or if the limit on the number of roads has not been reached, the processor will then analyze the selected road for processing. Although numerous methods for determining whether a road is to be included in a summary are possible, one exemplary non-limiting embodiment is shown here. In this illustrative embodiment, the processor determines, from all included roads, which road has the lowest weighted value. Then the processor analyzes whether the weighted value of the selected road is greater than or equal to: (X % (a base percentage)+counter value*Y % (an incremental percentage))*weighted value of lowest value already included road.

For example, if X=15 and Y=15, then the fourth road to be included would need to have a weighted value of (15%+3*15%)*weighted value of lowest value already included road; or 60%*weighted value of lowest value already included road. Using these exemplary values, any road beyond the sixth would not be included because it would require a value of 105% of the weighted value of lowest value already included road.

Once the summary is complete and all appropriate roads have been selected for inclusion, the processor 3 returns to the main routine for route display 523.

Figure 6A:
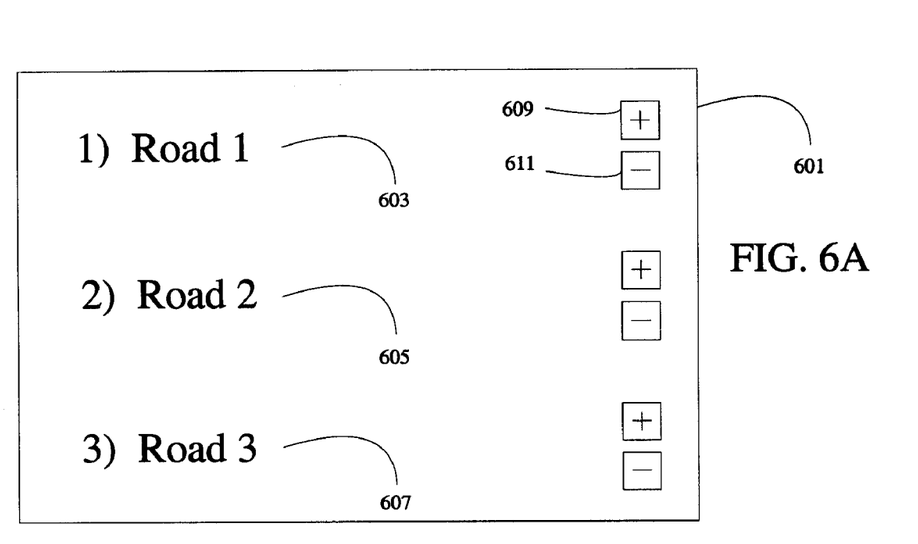
FIGS. 6A and 6B shows a view of an exemplary illustrative display of a route summary within an automobile.
Figure 6B:
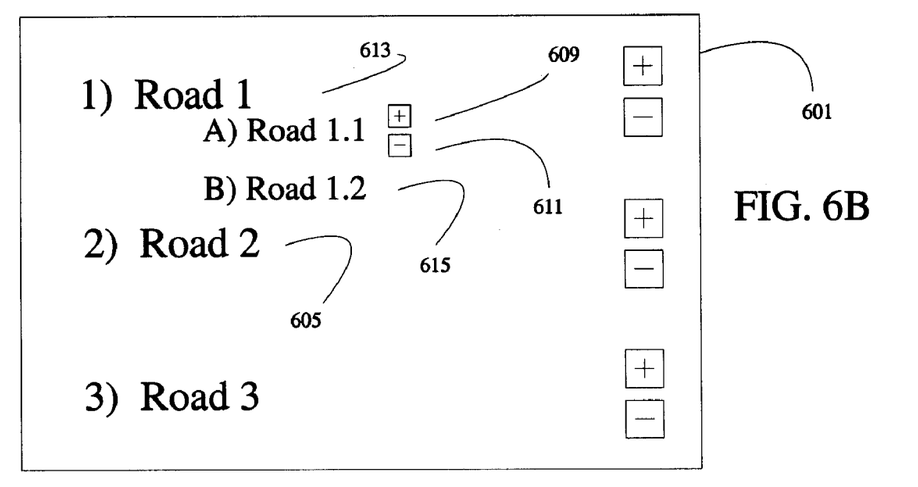

FIGS. 6A and 6B show views of exemplary displays of route summaries. Although exemplary in-car displays are shown, it is also possible that the summary would be delivered by SMS, voice, or in any other suitable medium.

In both FIGS. 6A and 6B, the route summary is displayed on a touchscreen display 601. In FIG. 6A, a three road summary is displayed 603, 605, 607 on the screen. Next to each road is a "+" 609 and "−" 611 are displayed for drill-down/move-up operations. If there are no roads on a route between two displayed roads, then the first of the displayed roads may not have the drill-down/move-up options. Additionally, at the top level display, there may only be a drill-down option displayed, as there is no briefer summary to move-up to. Further, the summary may be displayed without drill-down/move-up options at all.

If a driver touch-selects the "+" 609 in FIG. 6A, a display similar to that in FIG. 6B may be shown. The driver could also verbally instruct drill down, for example, by saying "First road, drill down." FIG. 6B shows a summarized route between the first and second roads. This may be a complete route, or may be a route as determined by the same algorithm used to produce the initial summary. A different algorithm may also be used.

In FIG. 6B, one 613 of the two roads 613, 615 has an additional drill down option 609, while one of the roads does not. This lets a driver know that the road 615 without drill-down is the road connecting to the next road 605 in the summary, and that there are additional connecting roads between the road 613 with drill-down and the one 615 without.

This is just one exemplary method of displaying the summary route on a touch-screen display. Any suitable method for display/delivery to the driver may be used.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A computer-implemented method of summarizing a navigation route comprising:
   receiving input specifying a destination;
   determining a navigation route to the destination;
   evaluating, by a computer, one or more roads on the route based at least in part on one or more predefined criteria, wherein at least one of the one or more roads has a base value assigned thereto;
   assigning a weighted value to at least one of the one or more roads;
   including a subset of the one or more roads in a route summary based at least in part on the evaluating, wherein the road with a highest weighted value is always included in the summary, and wherein a second road with a second highest weighted value is included in the summary if and only if the second highest weighted value is greater than or equal to a predefined percentage of the weighted value of the road with the highest weighted value; and
   outputting the route summary.

2. The method of claim 1, wherein the weighted value assigned to a road is equal to the base value multiplied by the distance traveled on the road.

3. The method of claim 1, further including:
   receiving input from a personal navigation device.

4. The method of claim 1, further including:
   receiving input from a vehicle navigation device.

5. The method of claim 1, further including:
   receiving input from a remote source.

6. The method of claim 1, wherein the outputting further includes sending an SMS message including the route summary to a wireless device.

7. The method of claim 1, wherein the outputting further includes delivering an email including the route summary.

8. The method of claim 1, wherein the-outputting further includes displaying the route summary on an in-vehicle display.

9. A computer readable storage medium comprising executable instructions that, when executed by the processor of a computing system, cause the computing system to:
   receive input specifying a destination;
   determine a navigation route to the destination;
   evaluate one or more roads on the route based at least in part on one or more predefined criteria, wherein at least one of the one or more roads has a base value assigned thereto;
   assign a weighted value to at least one of the one or more roads;
   include a subset of the one or more roads in a route summary based at least in part on the evaluating, wherein the road with a highest weighted value is always included in the summary, and wherein a second road with a second highest weighted value is included in the summary if and only if the second highest weighted value is greater than or equal to a predefined percentage of the weighted value of the road with the highest weighted value; and
   output the route summary.

10. The computer readable storage medium of claim 9, wherein executing the instructions further causes the computing system to:
    deliver the route summary.

11. The computer readable storage medium of claim 10, wherein the route summary is delivered in the form of an SMS message.

12. The computer readable storage medium of claim 10, wherein the route summary is delivered in the form of a voice message.

13. The computer readable storage medium of claim 9, wherein the computing system receives input from a personal navigation device.

14. The computer readable storage medium of claim 9, wherein the computing system receives input from a remote source through a wireless device in communication with the computing system and the remote source.

15. The computer readable storage medium of claim 9, wherein the computing system receives input from a vehicle navigation system.

* * * * *